United States Patent
Ganesan et al.

(10) Patent No.: US 9,785,307 B1
(45) Date of Patent: Oct. 10, 2017

(54) REORDER AND SELECTION PERSISTENCE OF DISPLAYED OBJECTS

(71) Applicant: Open Text Corporation, Waterloo (CA)

(72) Inventors: Ramkumar Ganesan, Bangalore (IN); Priya Lakshmi Muthuswamy, Bangalore (IN)

(73) Assignee: Open Text Corporation, Waterloo (CA)

( * ) Notice: Subject to any disclaimer, the term of this patent is extended or adjusted under 35 U.S.C. 154(b) by 201 days.

(21) Appl. No.: 13/628,402

(22) Filed: Sep. 27, 2012

(51) Int. Cl.
*G06F 3/0482* (2013.01)

(52) U.S. Cl.
CPC .................................. *G06F 3/0482* (2013.01)

(58) Field of Classification Search
CPC .............................. G06F 3/0481; G06F 3/0482
USPC ......................................................... 715/770
See application file for complete search history.

(56) References Cited

U.S. PATENT DOCUMENTS

| | | | | |
|---|---|---|---|---|
| 6,496,206 B1* | 12/2002 | Mernyk | ................ | G06F 3/0481 715/764 |
| 6,665,838 B1* | 12/2003 | Brown | .............. | G06F 17/30864 707/E17.111 |
| 7,574,669 B1* | 8/2009 | Braun | .................. | G06F 3/0483 715/776 |
| 8,549,435 B1* | 10/2013 | Bushore | ................ | G06F 17/24 715/769 |
| 8,868,506 B1* | 10/2014 | Bhargava | .......... | G06F 17/30011 707/648 |
| 8,887,052 B1* | 11/2014 | Young | ................. | H04L 12/1822 709/205 |
| 2001/0054089 A1* | 12/2001 | Tso | .................... | G06F 17/30873 709/219 |
| 2003/0079179 A1* | 4/2003 | Brown | ............. | G06F 17/30864 715/205 |
| 2003/0115546 A1* | 6/2003 | Dubey | .............. | G06F 17/30014 715/202 |
| 2004/0064471 A1* | 4/2004 | Brown | ............. | G06F 17/30864 |
| 2006/0045475 A1* | 3/2006 | Watanabe | ............ | G11B 27/034 386/241 |
| 2006/0174198 A1* | 8/2006 | Brown | ............. | G06F 17/30864 715/205 |
| 2006/0242163 A1* | 10/2006 | Miller | ................ | G06F 12/0875 |
| 2007/0198534 A1* | 8/2007 | Hon | .................. | G06F 17/30058 |
| 2007/0279438 A1* | 12/2007 | Takakura | .............. | G06F 3/0481 345/629 |
| 2008/0077597 A1* | 3/2008 | Butler | ............... | G06F 17/30265 |
| 2008/0092051 A1* | 4/2008 | Sidon | ............... | G06F 17/30991 715/731 |
| 2008/0092054 A1* | 4/2008 | Bhumkar | ......... | G06F 17/30899 715/739 |

(Continued)

*Primary Examiner* — Reza Nabi
*Assistant Examiner* — Daniel Rodriguez
(74) *Attorney, Agent, or Firm* — Sprinkle IP Law Group

(57) ABSTRACT

Providing a thumbnail view of a document or other dataset is disclosed. A user input data associated with a user interaction with a thumbnail as displayed in a viewer component is received via a user interface associated with a viewer component. A tracking data reflecting the interaction is stored in a local data structure. The tracking data stored in the local data structure is used to ensure that a thumbnail affected by the user input is displayed by the viewer component in a manner that reflects the user input.

7 Claims, 10 Drawing Sheets

(56) References Cited

U.S. PATENT DOCUMENTS

| | | | | |
|---|---|---|---|---|
| 2008/0222678 A1* | 9/2008 | Burke | H04N 5/76 | 725/44 |
| 2008/0298697 A1* | 12/2008 | Lee | G06F 3/04817 | 382/243 |
| 2008/0301583 A1* | 12/2008 | Akagi | H04N 1/0035 | 715/838 |
| 2008/0309644 A1* | 12/2008 | Arimoto | H04N 1/0035 | 345/173 |
| 2010/0026711 A1* | 2/2010 | Muramoto | G09G 5/02 | 345/619 |
| 2010/0077316 A1* | 3/2010 | Omansky | G06Q 10/10 | 715/751 |
| 2010/0115003 A1* | 5/2010 | Soules | G06F 17/30994 | 707/822 |
| 2010/0168888 A1* | 7/2010 | Ryuutou | G06Q 30/02 | 700/97 |
| 2010/0180196 A1* | 7/2010 | Matsusaka | G06F 17/211 | 715/255 |
| 2010/0185733 A1* | 7/2010 | Hon | G06F 17/30029 | 709/205 |
| 2011/0016169 A1* | 1/2011 | Cahill | G06F 17/3089 | 709/203 |
| 2011/0125755 A1* | 5/2011 | Kaila | G06F 17/30274 | 707/740 |
| 2011/0219297 A1* | 9/2011 | Oda | G06F 17/24 | 715/246 |
| 2011/0283242 A1* | 11/2011 | Chew | G06F 17/30994 | 715/863 |
| 2011/0295879 A1* | 12/2011 | Logis | G06F 17/30902 | 707/769 |
| 2012/0042251 A1* | 2/2012 | Rodriguez | | 715/723 |
| 2012/0110044 A1* | 5/2012 | Nagpal | G06F 17/30575 | 707/827 |
| 2012/0260195 A1* | 10/2012 | Hon | G06F 17/30873 | 715/753 |
| 2012/0284624 A1* | 11/2012 | Ording | G06F 3/04817 | 715/719 |
| 2012/0317476 A1* | 12/2012 | Goldman | G06F 17/2235 | 715/243 |
| 2013/0205246 A1* | 8/2013 | Schmidt | G06F 17/2235 | 715/781 |
| 2013/0298014 A1* | 11/2013 | Kodimer | H04N 1/00411 | 715/251 |
| 2014/0074964 A1* | 3/2014 | Cortes | H04L 67/32 | 709/217 |
| 2014/0101605 A1* | 4/2014 | Udvardy | G06F 3/0485 | 715/800 |
| 2014/0143229 A1* | 5/2014 | Wu | G06F 17/3028 | 707/715 |

* cited by examiner

REORDER AND SELECTION PERSISTENCE OF DISPLAYED OBJECTS

BACKGROUND OF THE INVENTION

Many third party viewers that support thumbnail views of documents or other sets of objects have a restriction of certain formats and size of the document or other object set. The thumbnails are also typically solely used for the purpose of navigating within a document or other object set. Maintaining the integrity of very large documents while allowing page modification or other operations, for example, is a big challenge. As a result, typical client side frameworks that support an infinite view of datasets (i.e., not limited by number of pages or other objects to be displayed, e.g., as thumbnails) typically only allow a user to view and navigation through them.

For a large document or other dataset, the viewer typically cannot maintain persistently any changes done by a user to the dataset, if permitted, as they get overwritten when fetched again from server. Current viewers typically do not support selection of items within infinite datasets; instead, knowledge of the selected state of a selected object typically gets lost during scrolling.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments, a viewer framework component is provided, which can embed any 3rd party viewer and provides an integrated thumbnail panel which has the capability to load thumbnails for huge documents with any number of pages. The thumbnail panel would also allow inline operations to reorder thumbnail images which would in turn rearrange the pages of the document when committed to the server. The user is able to rearrange the rows (thumbnail images) of a large dataset in any order via easy to use gestures like drag drop, context menu, up/down keys etc. For example, if the user is viewing a 100,000 page document and wishes to move a sequence of pages say 2-5 after page 56000, he would be able to use the context menu after selecting those, navigate to the target location in thumbnail panel and paste. He could continue to rearrange the large dataset of thumbnails and commit once he is done with all of them.

Figure 1:
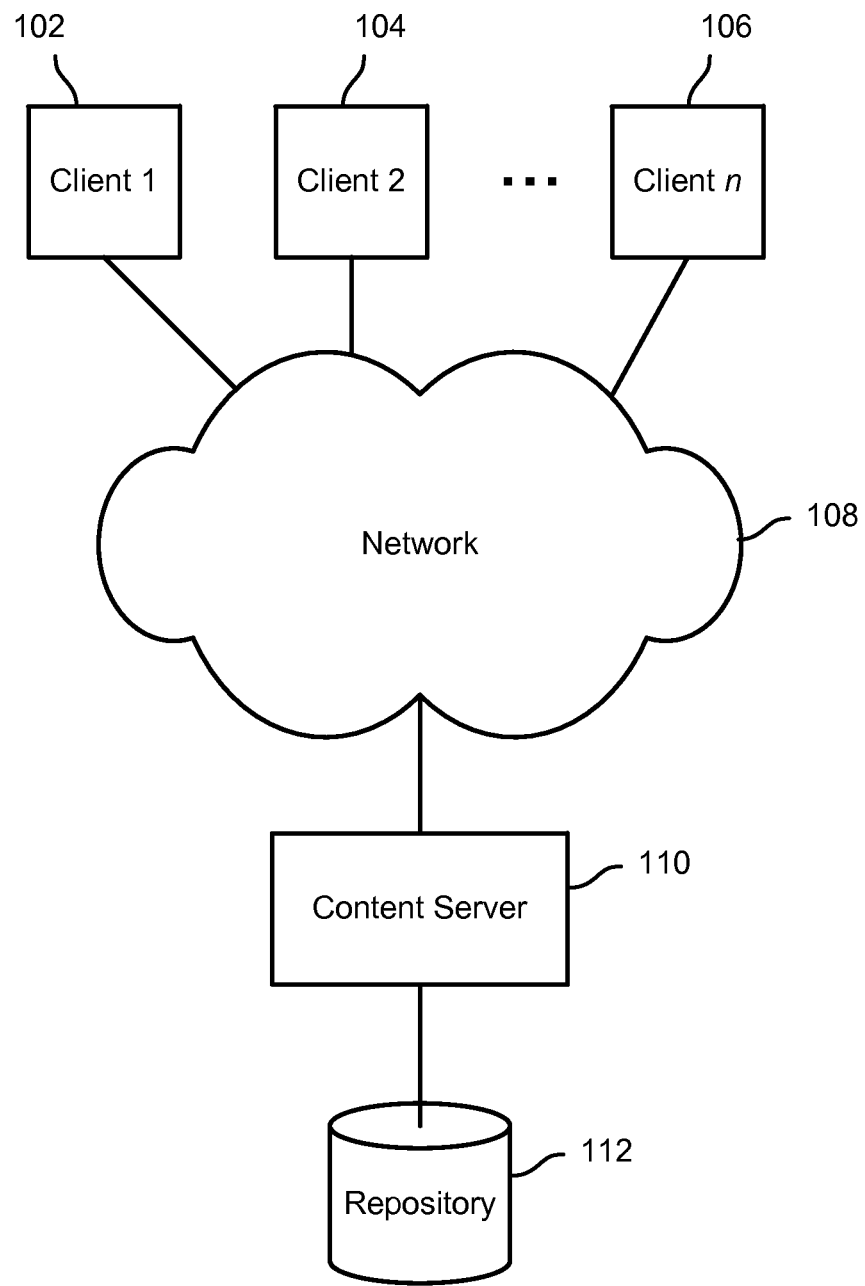
FIG. 1 is a block diagram illustrating an embodiment of a content management system.

FIG. 1 is a block diagram illustrating an embodiment of a content management system. In the example shown, a plurality of clients, represented in FIG. 1 by clients 102, 104, and 106, connect via a network 108, e.g., the Internet and/or a LAN or other enterprise network, to a content server 110 configured to provide access to content objects, such as documents, stored in a repository 112.

In various embodiments, a client such as clients 102, 104, and 106 is configured to provide an infinite grid display of a set of thumbnails each representing a component part of a larger document or other dataset. For example, a viewer may be provided which is configured to show a currently selected subset of thumbnails corresponding to a currently displayed range of pages or other objects comprising the larger document or other dataset. As used herein, unless otherwise indicated techniques described with respect to a dataset comprising a very large document made up of component pages may be applied to other datasets comprising other component object each of which may be represented by a corresponding thumbnail image.

In some embodiments, the viewer component is embedded in a client-side viewer framework, for example a runtime or other environment in which the third party viewer executes and/or is otherwise associated. The framework extends the basic functionality of the third party viewer—which is to display a current set of thumbnails and provide the ability to use them to navigate through the document—to include additional functionality as disclosed herein, including without limitation one or more of the following: the ability to display a range of thumbnails for a contiguous subset of pages comprising a very large document, regardless of document size (sometimes referred to herein as an "infinite" thumbnail and/or grid display); the ability to support reorder operations, including drag and drop or other selection and insertion gestures, regardless of document size and including to locations not initially in view, such that it is necessary to scroll to reach the desired insertion point; and the ability to remember operations, such as thumbnail selection, deletion, reorder, or page modification, until committed to the server, including the ability to indicate visually that such actions have been taken and have not yet been committed.

Figure 2A:
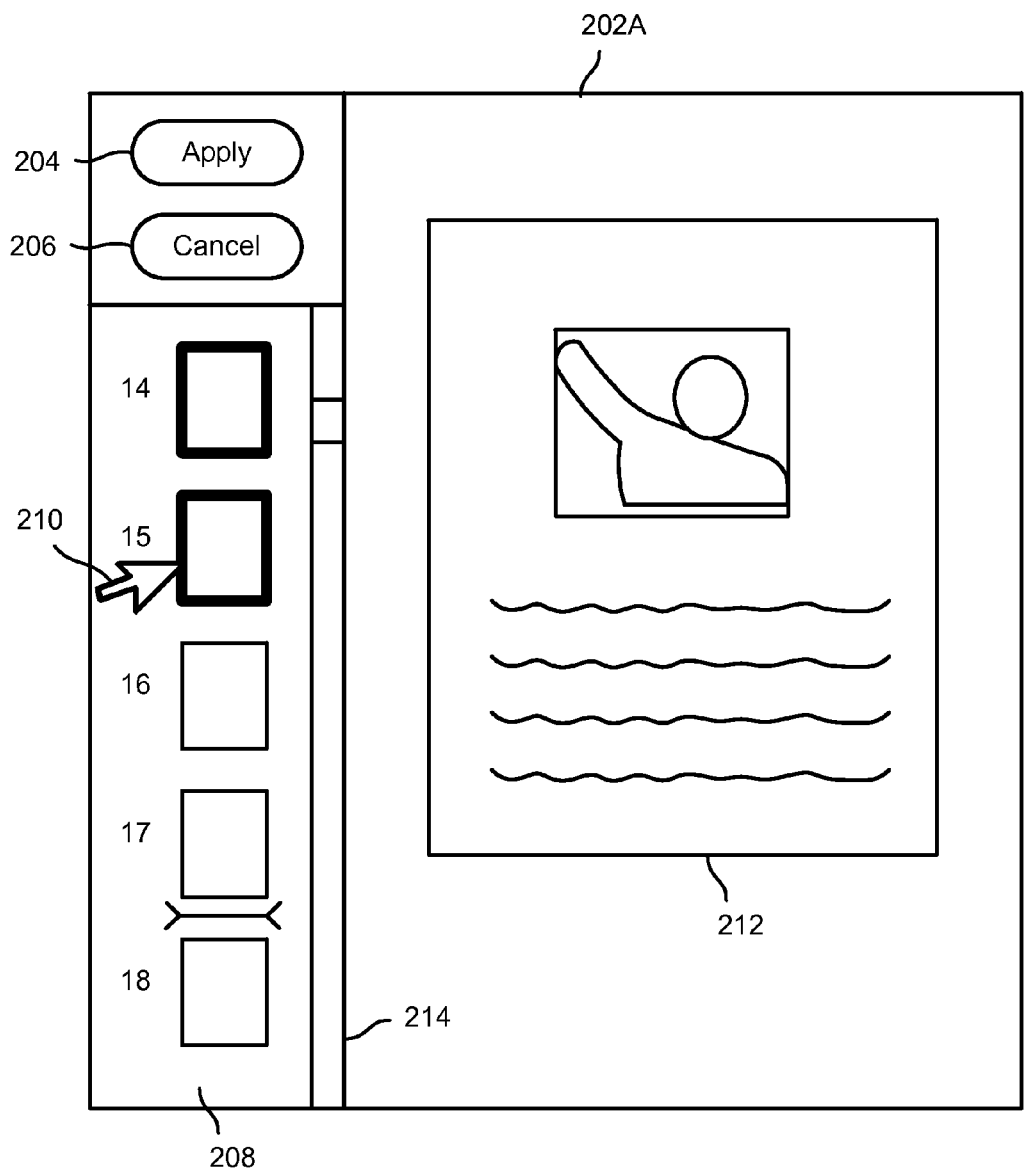
FIG. 2A is a block diagram illustrating an embodiment of an infinite grid display.

FIG. 2A is a block diagram illustrating an embodiment of an infinite grid display. In the example shown, a viewer interface 202A includes an "apply" button 204, the selection of which results in currently pending user changes to the document being committed to the server, for example by sending a network communication to a content server such as server 110 in FIG. 1 to commit changes by saving them to the document as stored persistently in the repository 112. The viewer interface 202A also includes a "cancel" button 206 to cancel pending changes and reset the viewer to display the document and associated thumbnails as received from the server and/or as last committed to the server. In a thumbnail display area 208, a set of thumbnails are displayed for a currently viewed range of pages, in this example pages 14-18. In other embodiments more or fewer thumbnails may be shown at one time. A cursor 210 has in the example shown been used to select thumbnails corresponding to pages 14 and 15, as indicated visually by the thicker line used as a border around the selected thumbnails, although any manner of indicating the selected state visually may be used. A scroll bar control 214 is provided to facilitate navigation to other parts of the document, which in various embodiments would result in a different set of thumbnails, i.e., those representing the range of pages to which the user has used the scroll bar control to navigate, being displayed in area 208.

In the example shown in FIG. 2A, an insertion cursor is shown between the thumbnails for pages 17 and 18, indicating in various embodiments that the user has selected the pages 14 and 15 and used cursor 210 to perform a drag and drop gesture to the location indicated between pages 17 and 18. In various embodiments, other gestures and/or inputs may be used to reorder thumbnails, for example holding down the control key while using the "+" and "−" keys to move thumbnails up or down as desired.

Figure 2B:
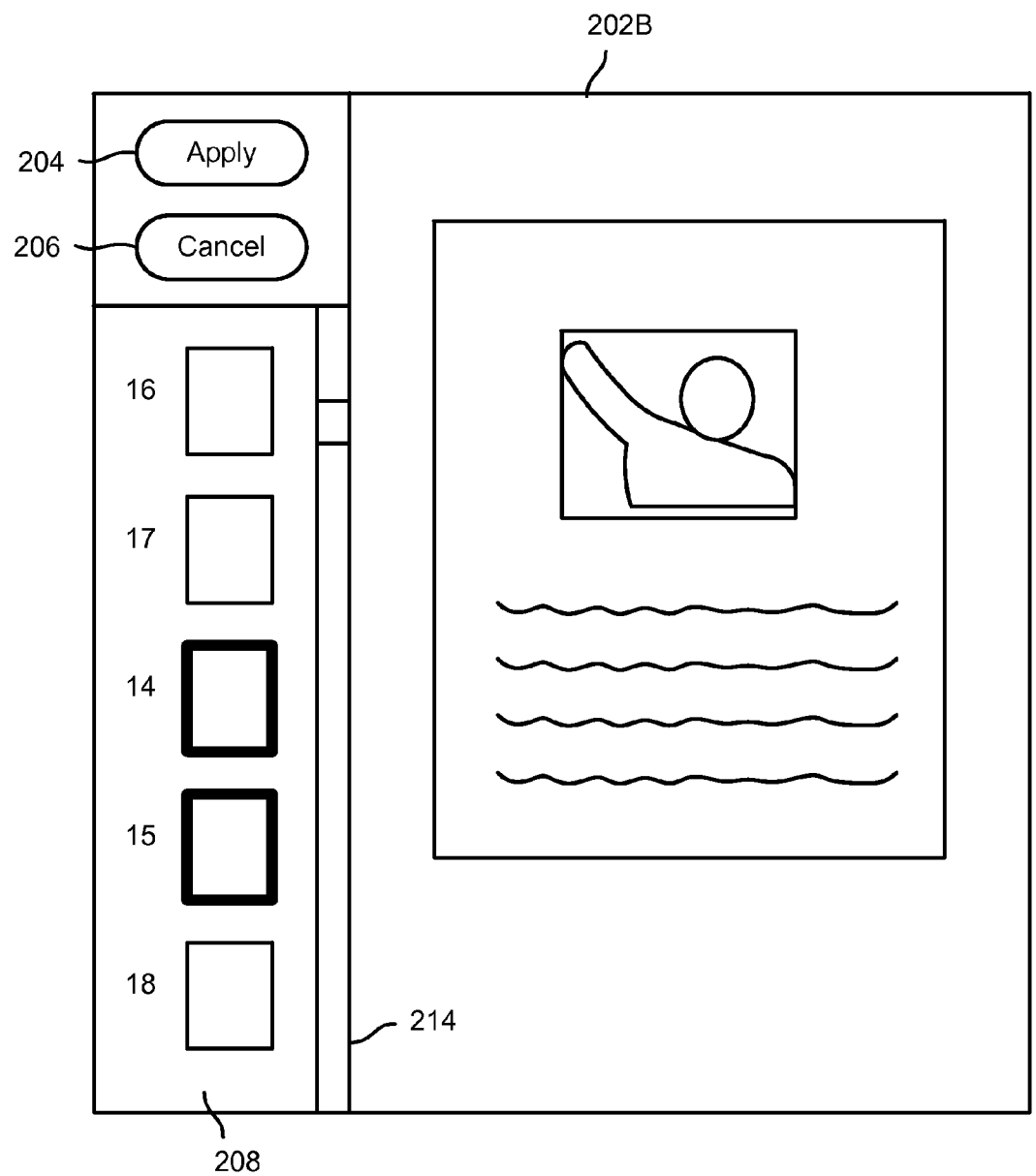
FIG. 2B is a block diagram illustrating an embodiment of an infinite grid display, in which the result of a drag and drop of the thumbnails representing pages 14 and 15 have been dragged to and dropped at an insertion point between pages 17 and 18.

FIG. 2B is a block diagram illustrating an embodiment of an infinite grid display, in which the result of a drag and drop of the thumbnails representing pages 14 and 15 have been dragged to and dropped at an insertion point between pages 17 and 18. In the example shown, the thumbnails representing pages 14 and 15 remain selected and a visual indication of their selected state is provided. In some embodiments, selection of the "apply" button 204 would result in the reorder operation being committed to the server. The document in some embodiments would be repaginated and a refreshed set of thumbnails retrieved from the server and displayed in area 208, reflected the committed change.

Figure 2C:
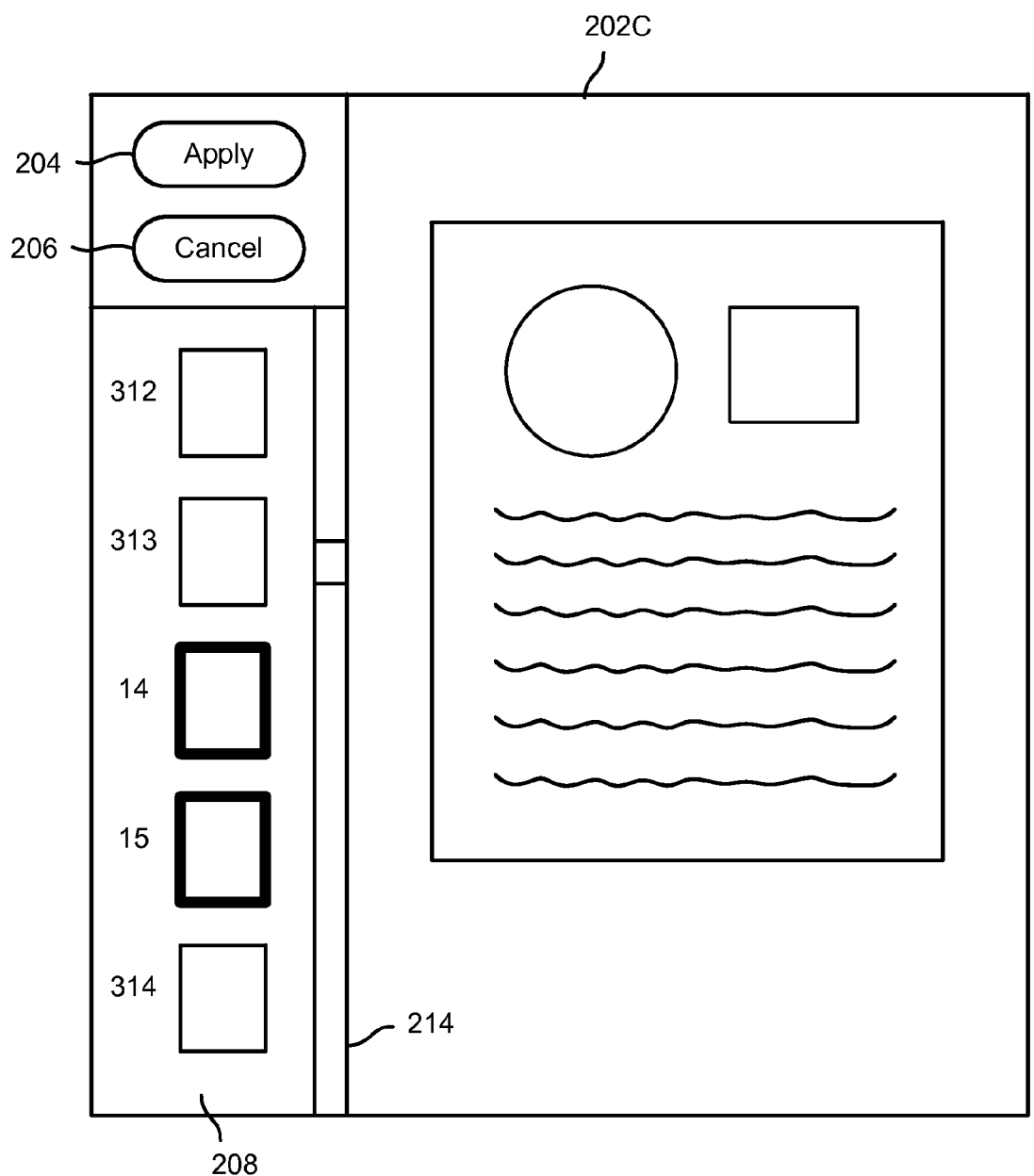
FIG. 2C is a block diagram illustrating an embodiment of an infinite grid display in which a reorder operation to a portion of the document not within the original window of display has been completed.

FIG. 2C is a block diagram illustrating an embodiment of an infinite grid display in which a reorder operation to a portion of the document not within the original window of display has been completed. In this example, the aforementioned pages 14 and 15 have been moved to an insertion point between pages 313 and 314 in the document, for example via a cut and paste or other operation. As in FIG. 2B, the thumbnails for pages 14 and 15 remain selected and a visual indication of their selected state is provided.

Figure 2D:
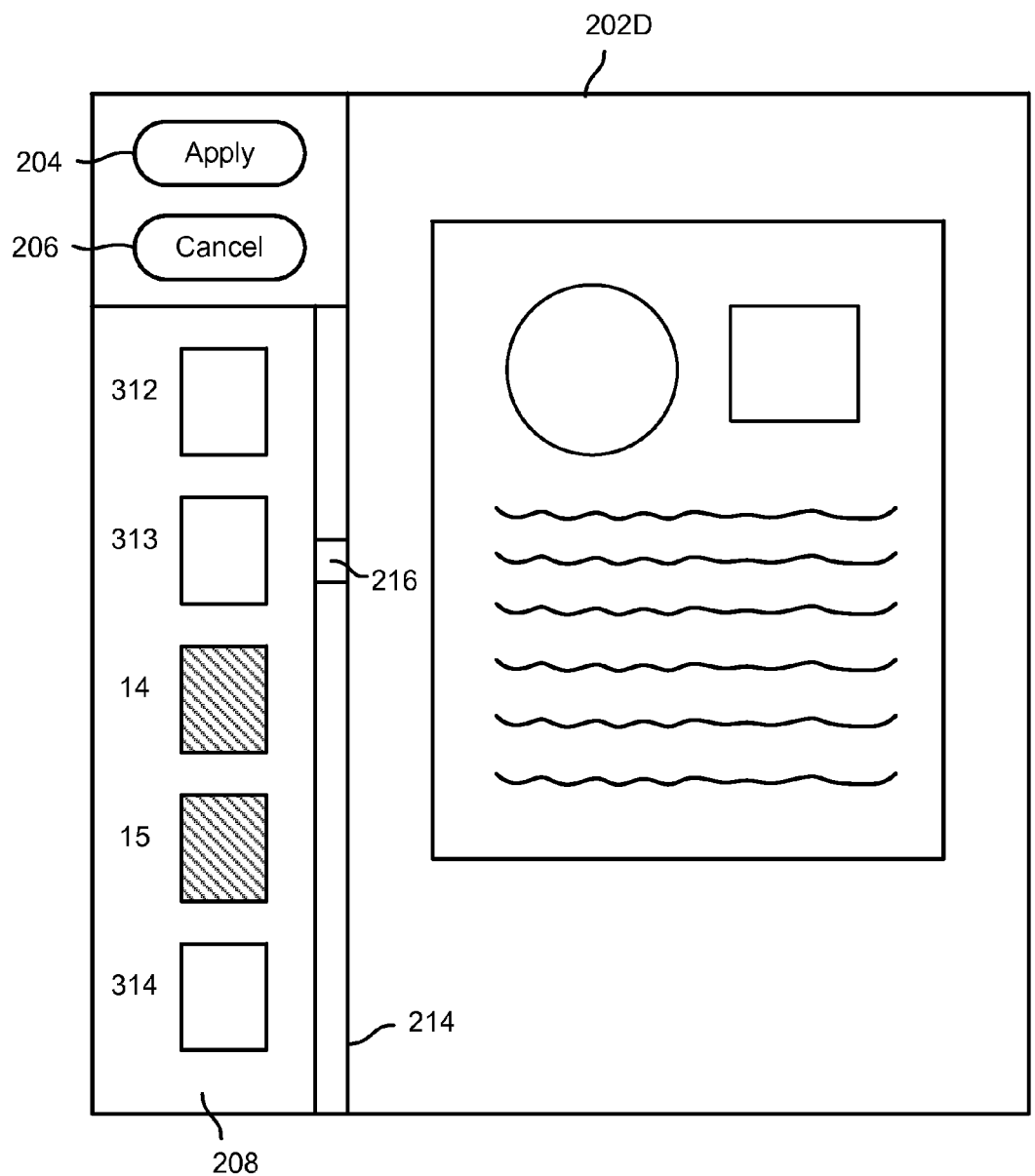
FIG. 2D is a block diagram illustrating an embodiment of an infinite grid display in which a reorder operation has been performed but not yet committed.

FIG. 2D is a block diagram illustrating an embodiment of an infinite grid display in which a reorder operation has been performed but not yet committed. In the example shown, the user may have navigated to another portion of the document and/or deselected pages 14 and 15 without (as of yet) committing the changes. In this example, a visual indication that is different from the indication used to indicate a selected state is provided, to alert the user to the fact that a modification (in this case reorder) has been made but not yet committed. In various embodiments, this may alert the user to the need to commit a change, and may make it easier for the user to navigate to a previously modified portion of the document to verify the changes and/or make further modifications prior to committing changes to the server, if desired.

In various embodiments, other modifications, and persistence and consistent displaying of same until committed, are supported, including without limitation deletion of pages and/or changes to page content.

Some documents, for example in the enterprise context, can be very large, such as 10,000 or 100,000 pages. Typical browsers cannot handle 100,000 images in a thumbnail panel at a time and would crash. Hence an effective mechanism to fetch the range of thumbnails required is provided in various embodiments. The thumbnails images are stored on the server side as renditions to the document. As the user scrolls through the thumbnail panel or jumps to a particular page, the appropriate range of thumbnails is fetched and displayed.

In various embodiments, the fetched thumbnails are displayed in a manner that reflects any reorder operations that have been performed by the user before scrolling to a new location within the document. In some embodiments, a reorder cache is provided at the client side and used to keep track of reorder and/or other changes that have not been committed. In response to a request to fetch a sequence of thumbnails, the viewer and/or viewer framework first looks into this reorder cache maintained at the client side, and if the need thumbnails are not found the browser is used to obtain the needed thumbnails from the server.

Figure 3:
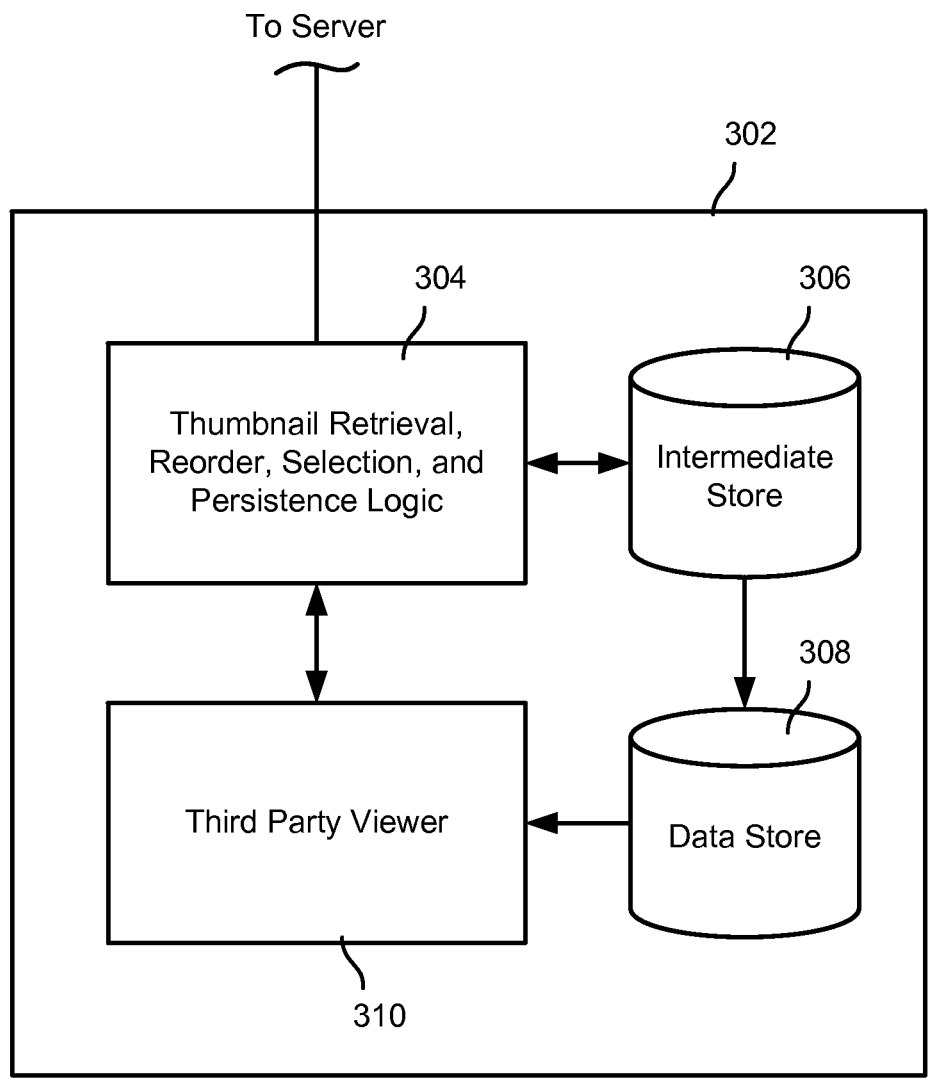
FIG. 3 is a block diagram illustrating an embodiment of a system configured to provide reorder and selection persistence of displayed objects.

FIG. 3 is a block diagram illustrating an embodiment of a system configured to provide reorder and selection persistence of displayed objects. In the example shown, a client system 302, for example a client computer system such as clients 102, 104, and 106 of FIG. 1, includes a communication interface, such as a network interface card, and a physical and/or wireless connection to a remote server via a network connection. A thumbnail retrieval, modification, and display logic 304 manages interactions with the server as required to cause thumbnails to be displayed and interacted with as disclosed herein. During a viewing and interaction session, the logic 304 retrieves thumbnail images as needed from the server and stores them in an intermediate store 306, for example a set of locations in memory. The logic 304 operates, as described more fully below, to populate a viewer primary data store 308 with the correct set of n (i.e., a prescribed number) of thumbnail images to be displayed currently by a third party viewer component 310.

The viewer component 310 displays the thumbnails, for example in a grid or other view, in an order and with display attributes as determined by the logic 304. As the user interacts with thumbnails displayed in the grid, the logic 304 records user interactions, e.g., selection, reorder, and deletion interactions that have not yet been committed, in a table or other data structure stored in intermediate store 306. In various embodiments, thumbnails retrieved from the server are cached in the intermediate store and used to include previously retrieved thumbnails in the set of thumbnails provided to data store 308 to be displayed by viewer component 310.

In various embodiments, the aforementioned grid or other display structure is the client side representation of the thumbnail panel where the thumbnails are shown. At any point of time, the thumbnail panel shows only a prescribed number of images, e.g., 15 images, and swaps data in and out as required while scrolling. When user scrolls to an arbitrary position in the thumbnail panel, the logic 304 automatically fetches from the server and stores in the intermediate store 306 any thumbnails in the range of thumbnails to be displayed which are not already in the intermediate store 306 (e.g., as a result of having been displayed previously) and populates the data store 308 with the thumbnails to be displayed.

The logic 304 updates the intermediate store as required to keep track of all the reorder or other (e.g., delete) operations done within the thumbnails. As the user keeps reordering (or deleting) pages within the thumbnail panel, the changes are immediately recorded in the intermediate store. All reorder (and delete) operations are persisted only at the intermediate store, until committed to the server by the user, and the thumbnails panel would reflect these changes when a thumbnail range that has been affected by a previous but not yet committed user action is revisited by scrolling. In some embodiments, the logic 304 reads operation persistence data stored in intermediate store 306 to determine which thumbnails are to be displayed, in which order and with which display attributes (e.g., indication of selected state, indication of previously having been reordered, etc.), and causes the correct thumbnails to be stored in data store 308 and used by viewer component 310 to populate and display the grid of thumbnails.

Figure 4:
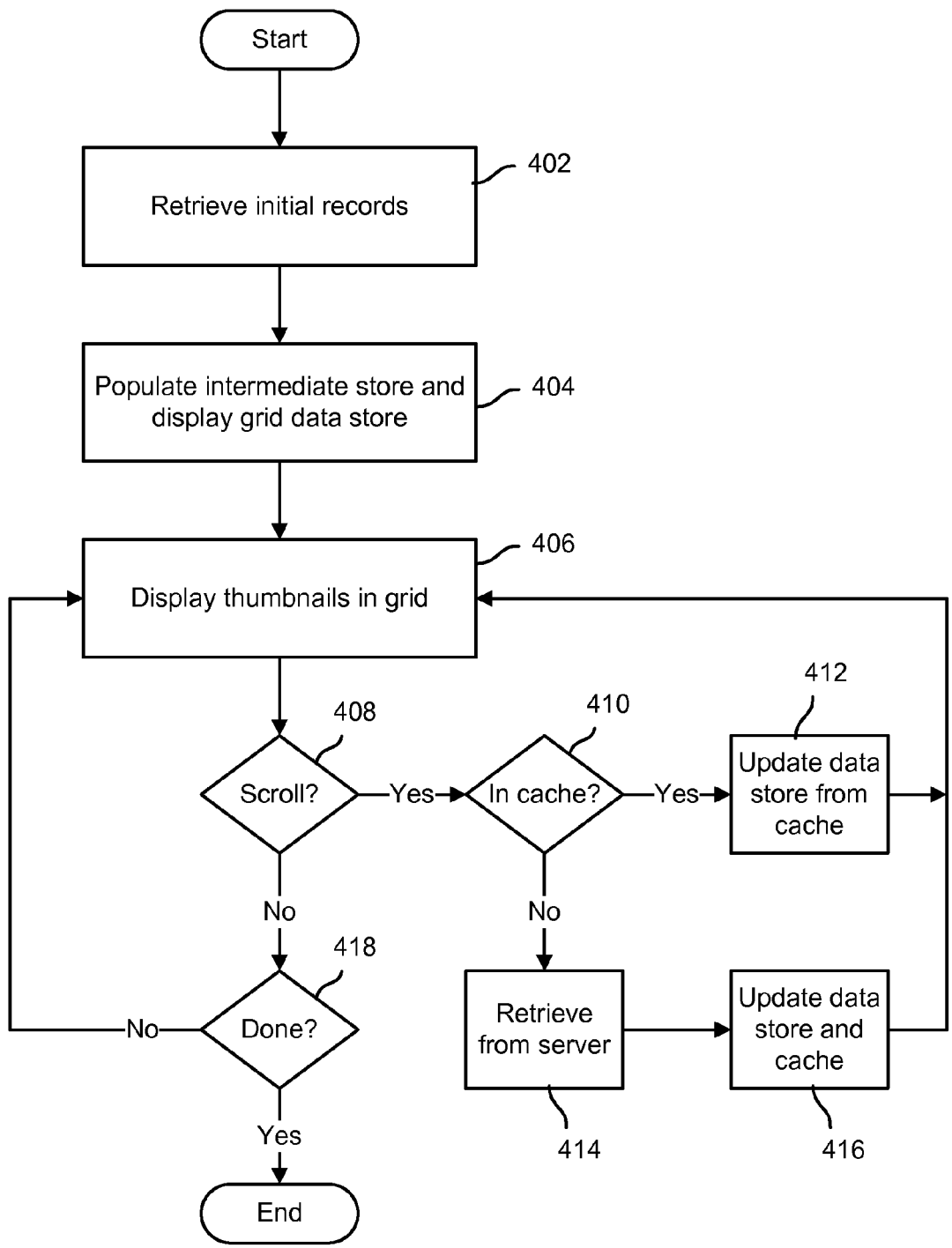
FIG. 4 is a flow chart illustrating an embodiment of a process to retrieve thumbnails for display.

FIG. 4 is a flow chart illustrating an embodiment of a process to retrieve thumbnails for display. In the example shown, when the viewer is opened an initial set of records, e.g., the first n thumbnails, is retrieved (402) and used to populate both the intermediate store (cache) and the display grid primary data store (404). The thumbnails are read from the data store and displayed in the grid (406), e.g., in a display area such as area 208 of FIGS. 2A-2D. If the user scrolls to another location within the document (408), it is determined whether the thumbnails for the destination location to which the user has scrolled are all already in the cache (410). If so, the data store is updated from the cache (412) and the correct set of thumbnails is displayed (406). If any selection, reorder, or other operations are pending and have not been committed, in various embodiments the thumbnails to be displayed, and the order and manner in which they are to be displayed, is determined in order to determine which thumbnails to check for in the cache (410). For example, in the example shown in FIG. 2C, in response to the user scrolling to a range beginning at page 312, a determination would be made, for example based on data stored in the intermediate store, which are the following four thumbnails to be displayed, in which order, and for each in which manner. In the example shown in FIG. 2C, a data structure would be read to determine that thumbnails 313, 14, 15, and 314 should follow 312, in that order, and that 14 and 15 should be displayed in a selected state.

Referring further to FIG. 4, if any thumbnail determined to be required is determined not to be in the cache already (410), those thumbnails are retrieved from the server (414), the intermediate and primary data store are updated (416), and the correct thumbnails are displayed in the correct order and manner (406). The process repeats as the user scrolls to different locations (408) until done (418), e.g., the viewer component is closed.

Figure 5:
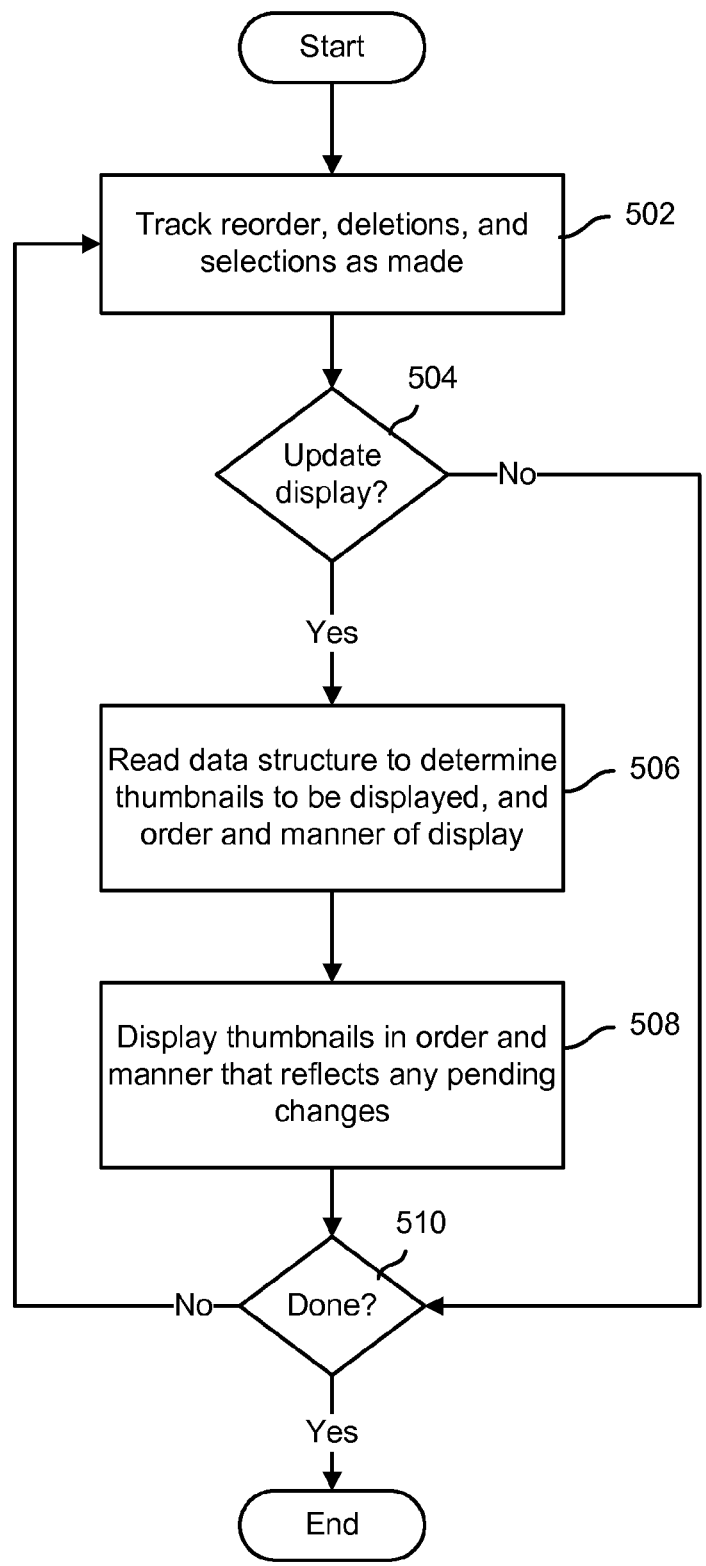
FIG. 5 is a flow chart illustrating an embodiment of a process to display thumbnails.

FIG. 5 is a flow chart illustrating an embodiment of a process to display thumbnails. In the example shown, as user interactions such as reorder, delete, or select operations are made, such actions are tracked in a table or other data structure (502), such as one stored in an intermediate data store such as data store 306 of FIG. 3. If the display is required to be updated (504), e.g., because the user interacts with the display and/or scrolls to a new location within the document, the user interaction data structure is read (506) to determine which thumbnails are to be displayed in which order and manner. The determined thumbnails are then displayed in the order and manner determined (508). The process continues until done (510), for example the viewer component is closed.

Figure 6:
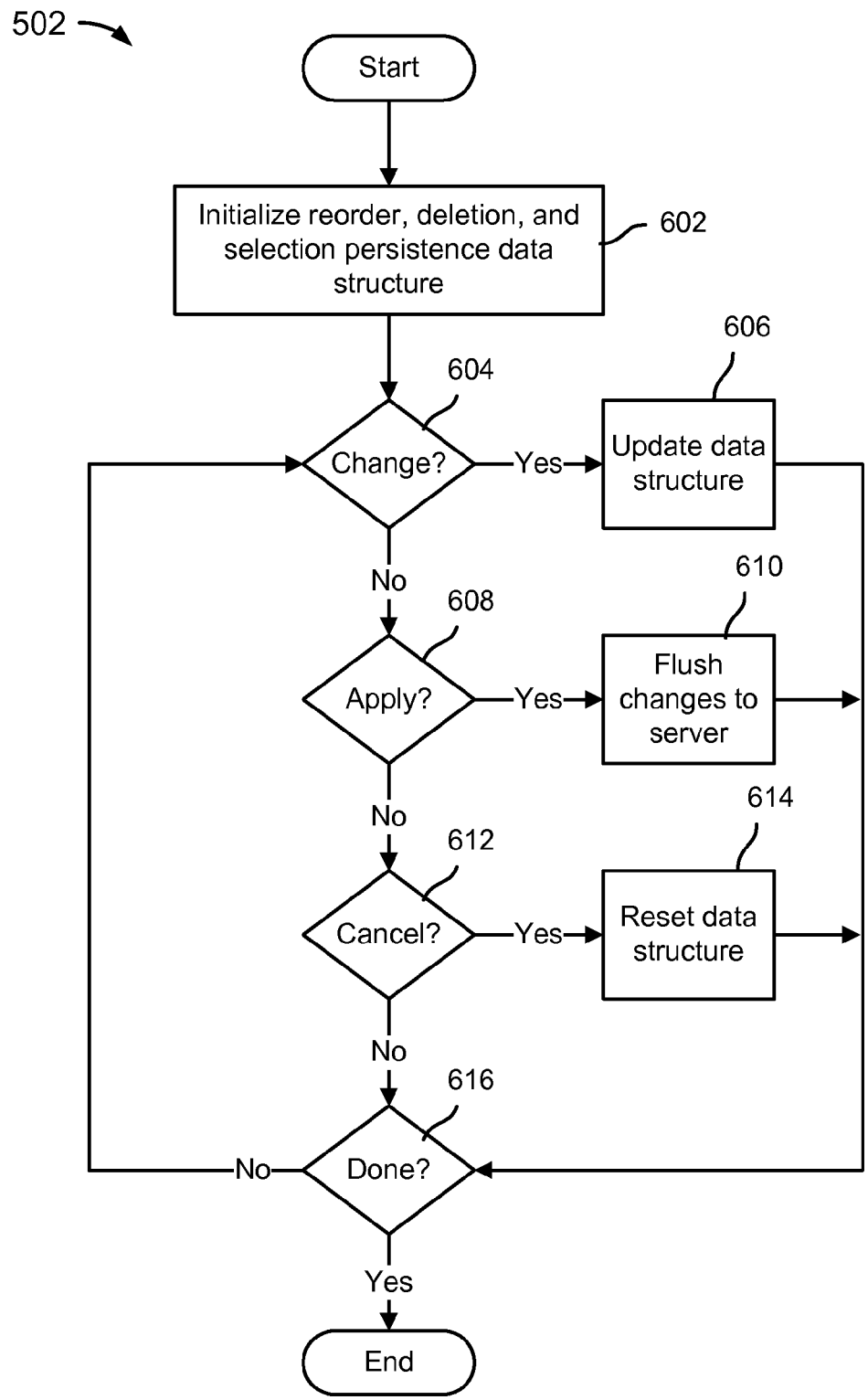
FIG. 6 is a flow chart illustrating an embodiment of a process to track user interactions with displayed thumbnails.

FIG. 6 is a flow chart illustrating an embodiment of a process to track user interactions with displayed thumbnails. In some embodiments, step 502 of FIG. 5 includes the process of FIG. 6. A table or other data structure to track reorder, deletion, selection, and/or other supported and tracked user interactions is initiated (602). If there is any change, e.g., a user gesture or other interaction with displayed thumbnails (604), the data structure is updated to keep track of the changes (606). If an "apply" or other control to commit changes is selected (608) changes stored previously in the data structure are flushed to the server (610), by sending one or more server requests to implement the changes at the server (e.g., page reorder, delete, etc.). If a "cancel" control is selected (612) the data structure is reset (614) and pending user interactions that have not yet been committed are forgotten. The process of FIG. 6 continues until done (616), e.g., the viewer component is closed.

Figure 7:
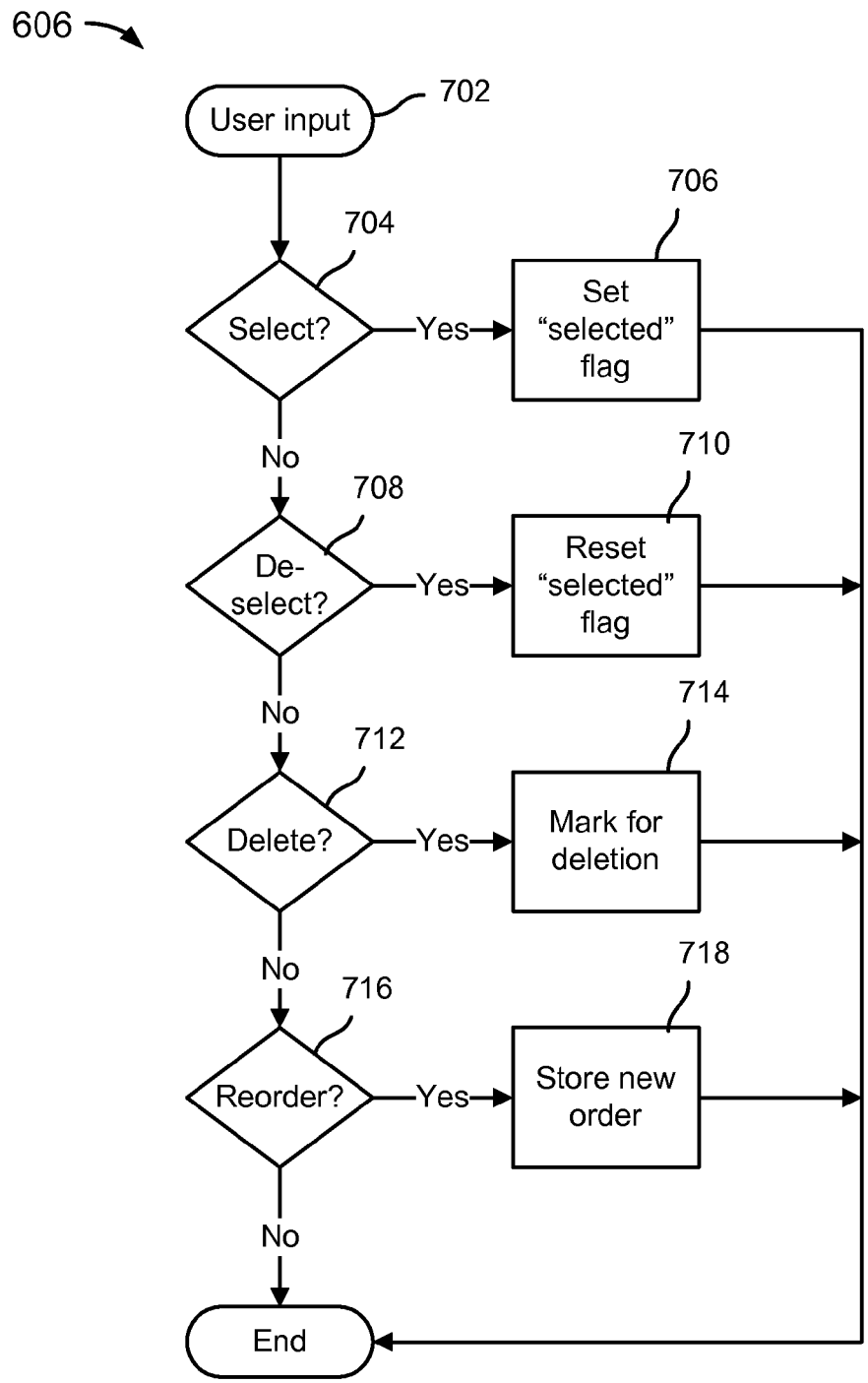
FIG. 7 is a flow chart illustrating an embodiment of a process to track user interactions with displayed thumbnails.

FIG. 7 is a flow chart illustrating an embodiment of a process to track user interactions with displayed thumbnails. In some embodiments, step 606 of FIG. 6 includes the process of FIG. 7. In the example shown, when a user input is received (702) if the action is a thumbnail select action then one or more flags corresponded to the selected thumbnail(s) is/are set to a "selected" state (706). If the action is a de-select action (708), the associated selection state flags are reset of the unselected state (710). If the action is a page deletion (712) the corresponding pages are marked for deletion (714). If the action is a reorder input (716), data indicating the new order and location of affected thumbnails is stored (718). Subsequently, for example as the user scrolls through the document, data stored as shown in FIG. 7 is read to determine the correct thumbnails to be displayed, and the correct order and manner of display, for example as described above.

In various embodiments, techniques disclosed herein may allow one or more of the following to be accomplished: enhance the capability of infinite grid implementations to handle user interactions, such as page reorder, modification, and deletion, and not just viewing; scale up to any size of document having large number of pages; leverage the power of paged chunks for infinite content augmented by easy to use gestures that makes life easier for the user while reordering/modifying huge documents; give the user a visual confirmation of the new order of pages of that he would commit and hence prevents errors while modifying important documents; and/or maintain the selection of page(s) while scrolling in the thumbnail panel and preserves the context for the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to provide a thumbnail view of a document or other dataset, comprising:
    a memory or other data storage device; and
    a processor coupled to the memory or other data storage device and configured to:
    receive via a user interface associated with a viewer component a user input data associated with a user interaction with a first thumbnail as displayed in the viewer component at a first location within the document or other dataset;
    store in a local data structure, in the memory or other storage device, a tracking data reflecting the interaction;
    receive, via the user interface associated with the viewer component, user input corresponding to a request to view one or more thumbnails at a second location within the document or other dataset, wherein the second location of the document or other dataset corresponds to a location of the document or other dataset having at least one different thumbnail from thumbnails at the first location within the document or other dataset;
    determine, by, the viewer component, in response to receiving the user input corresponding to the request to view the one or more thumbnails at the second location within the document or other dataset, the one or more thumbnails that correspond to the second location within the document or other dataset by reading the tracking data from the local data structure;
    determine, by the viewer component, whether the local data structure stores tracking data relating to any of the one or more thumbnails that corresponds to the second location within the document or other dataset; and
    if the local data structure stores tracking data relating to any of the one or more thumbnails that correspond to the second location within the document or other dataset, then retrieve, by the viewer component, from a server, any of the one or more thumbnails that is not stored in the local data structure, and use the tracking data stored in the local data structure to ensure that a thumbnail affected by the user input is displayed by the viewer component in a manner that reflects the user input,
    wherein the viewer component is embedded in a client-side viewer framework in which a third party viewer is executed such that the viewer component extends functionality of the third party viewer.

2. The system of claim 1, wherein the user interaction comprises one or more of the following: a thumbnail select input, a drag and drop gesture, a control plus + or − key, a control plus up arrow or down arrow key, and a cut and paste interaction.

3. The system of claim 1, wherein the tracking data is used to ensure that the thumbnail affected by the user input is displayed by the viewer component in a manner that reflects the user input after the user has navigated via the user interface to a location within the document or other dataset with which the thumbnail affected by the user input is not associated, and subsequently navigated back to view a portion of document or other dataset with which the thumbnail affected by the user input is associated.

4. The system of claim 1, wherein displaying the thumbnail affected by the user input in a manner that reflects the user input includes providing a visual indication that the thumbnail affected by the user input has been affected by the user input.

5. The system of claim 1, wherein the processor is further configured to retrieve from the server a set of thumbnails to be displayed in the viewer component and store at least a subset of the set of thumbnails in an intermediate store configured to serve as a thumbnail cache.

6. The system of claim 1, wherein the processor uses the tracking data stored in the local data structure to ensure that the thumbnail affected by the user input is displayed by the viewer component in a manner that reflects the user input so as to provide a visual indication that a change affecting the thumbnail affected by the user input has not been committed to a remote server.

7. A computer program product for providing a thumbnail view of a document or other dataset, the computer program product being embodied in a tangible, non-transitory computer readable storage medium and comprising computer instructions for:
    receiving via a user interface associated with a viewer component a user input data associated with a user interaction with a first thumbnail at a first location within the document or other dataset as displayed in the viewer component;
    storing in a local data structure a tracking data reflecting the interaction;
    receiving, via the user interface associated with the viewer component, user input corresponding to a request to view one or more thumbnails at a second location within the document or other dataset, wherein the second location of the document or other dataset corresponds to a location of the document or other dataset having at least one different thumbnail from thumbnails at the first location within the document or other dataset;
    in response to receiving the user input corresponding to the request to view the one or more thumbnails at the second location within the document or other dataset, determining, by the viewer component, the one or more thumbnails that correspond to the second location within the document or other dataset by reading the tracking data from the local data structure;
    determining, by the viewer component, whether the local data structure stores tracking data relating to any of the one or more thumbnails that corresponds to the second location within the document or other dataset; and
    if the local data structure stores tracking data relating to any of the one or more thumbnails that correspond to the second location within the document or other dataset, then retrieving, by the viewer component from a server, any of the one or more thumbnails that is not stored in the local data structure, and using the tracking data stored in the local data structure for any of the one or more thumbnails that correspond to the second location within the document or other dataset for which the local data structure stores tracking data to ensure that a thumbnail affected by the user input is displayed by the viewer component in a manner that reflects the user input,
wherein the viewer component is embedded in a client-side viewer framework in which a third party viewer is executed such that the viewer component extends functionality of the third party viewer.

* * * * *